United States Patent
Morlier (12)

(10) Patent No.: US 6,176,038 B1
(45) Date of Patent: Jan. 23, 2001

(54) HOUSEPLANT MAINTENANCE DEVICE AND METHOD

(76) Inventor: Lynn Morlier, 1309 Cadiz St., New Orleans, LA (US) 70115

(*) Notice: Under 35 U.S.C. 154(b), the term of this patent shall be extended for 0 days.

(21) Appl. No.: 09/055,968

(22) Filed: Apr. 7, 1998

Related U.S. Application Data

(60) Provisional application No. 60/053,578, filed on Jul. 17, 1997.

(51) Int. Cl.$^7$ ................................................ A01G 27/04
(52) U.S. Cl. ............................................................ 47/81
(58) Field of Search ............................ 47/48.5, 79, 80, 47/81

(56) References Cited

U.S. PATENT DOCUMENTS

| | | |
|---|---|---|
| 320,588 | 6/1885 | Rhoads . |
| 918,563 | 4/1909 | Lewis . |
| 1,216,642 | 2/1917 | White . |
| 1,247,766 * | 11/1917 | White ........................ 47/81 |
| 1,251,552 | 1/1918 | Marks . |
| 1,928,810 | 10/1933 | Burford . |
| 2,810,235 | 10/1957 | Magid . |
| 3,786,598 * | 1/1974 | Stadelhofer ............... 47/81 |
| 4,083,146 | 4/1978 | Brankovié . |
| 4,236,352 | 12/1980 | Heaney et al. . |
| 5,193,305 * | 3/1993 | Holtkamp, Jr. ............ 47/81 |
| 6,023,886 * | 2/2000 | Momiyama et al. ....... 47/81 |

FOREIGN PATENT DOCUMENTS

| | | |
|---|---|---|
| 1104 * | of 1875 | (GB) . |
| 10-127177 * | 5/1998 | (JP) . |
| 10-304783 * | 11/1998 | (JP) . |
| 10-313713 * | 12/1998 | (JP) . |
| 11-32602 * | 2/1999 | (JP) . |

* cited by examiner

*Primary Examiner*—Michael J. Carone
*Assistant Examiner*—Jeffrey L. Gellner
(74) *Attorney, Agent, or Firm*—Burns, Doane, Swecker & Mathis, L.L.P.

(57) ABSTRACT

A houseplant maintenance device includes a base which acts as a water reservoir and which receives a potted plant therein. The pot is received in a gasket which is secured to the base. Embedded in the gasket is a support ring including downwardly angled cups, which receives hanging rods to allow hanging the device. The gasket is the color of the pot when the pot is wet, which gives a visual reference for determining the moisture content of the soil in the pot. The gasket is movably secured to the base by a set of lets which are received in a set of tracks inside the base. A wick is also provided for drawing moisture from within the base to the soil in the pot, the wick being encased by a water-impervious material. Other wicks are also constructed to convey mineral nutrients into the soil. A tongue-and-groove assembly on the bottom of the base allows the device to be removably secured in place.

10 Claims, 7 Drawing Sheets

HOUSEPLANT MAINTENANCE DEVICE AND METHOD

This is a continuation of Provisional Utility Patent Application Serial Number 60/053,578, filed Jul. 17, 1997, entitled HOUSEPLANT MAINTENANCE DEVICE.

BACKGROUND OF THE INVENTION

1. Field of the Invention

The invention relates to apparatus and processes for maintaining a houseplant. More specifically, the invention relates to apparatus and processes for maintaining the moisture level and nutrient content of potting soil in which a houseplant is planted.

2. Brief Description of the Related Art

Two essentials for sustaining plant life, timely moisture and sufficient sunlight, have discouraged many from the cultivation of houseplants. The effort and exactness required for conventionally watering plants has been beyond the ability and focus of many who would otherwise enjoy the proximity and decorative value of plants. Wick devices used for low maintenance watering have thus far not proven universally satisfactory, due to the inability to optimize, direct, and modulate delivery of moisture to the houseplant. This deficiency usually results in a tendency to keep the potting soil and the houseplant too wet, a condition which can have adverse effects on the plant, e.g., root rot. Moreover, spaces with sunlight sufficient to support plant life are always at a premium indoors. When windows are available to provide sunlight, furniture often requires protection from the moist soil needed to sustain the plant.

SUMMARY OF THE INVENTION

The present invention overcomes the deficiencies of the prior art, and provides an apparatus which achieves three desirable goals which, taken individually or together, are substantial improvements over prior art houseplant maintenance devices. A self-contained apparatus provides: directed, controllable, and low maintenance watering of a houseplant, which is modulated to the specific needs of the plant; flexibility for use in all of the conventional ways plants are mounted, hung, or set around the environment in which it is desirable to locate a houseplant; and a modularly constructed apparatus for individualization, substitution, rearrangement, and rotation of houseplants. According to the present invention, an apparatus in accordance therewith is of durable construction and amenable to low-cost manufacture, thereby making a houseplant maintenance device according to the present invention affordable for sale.

According to one embodiment of the present invention, a wick for conducting a nutrient within a plant container comprises a length of core material including a first end and a second end, the core material capable of conducting said nutrient from the first end to the second end by wicking, and a casing around a portion of the core material.

According to another embodiment of the present invention, a houseplant maintenance device usable with a wick device inserted into and extending from a bottom surface of a planting pot comprises a base having a housing and comprising an interior which is sealed to form a reservoir in the base for sealingly holding water therein; a top comprising an opening therein which communicates the reservoir with the exterior of the base; a track in the interior of the base, the track comprising an opening which communicates the track with the interior, the track further comprising an end and a seat, the seat located at the track end and communicating with the track; and a gasket comprising a gasket ring for supporting a planting pot therein, the gasket ring having a shape substantially similar to the base top opening; a leg extending from the gasket ring; and a foot on the leg opposite the gasket ring; wherein the foot, the track, and the track opening are sized for the foot to enter the track opening and to slide from the opening to the track seat when the gasket is partially inserted into the base interior through the base top opening.

According to yet another embodiment of the present invention, a method of monitoring the moisture content of soil in a planting pot, the planting pot having a first color when substantially dry and a second color when substantially wet from moisture from the soil, comprises the steps of positioning a material immediately adjacent the planting pot, the material having a color substantially similar to the planting pot second color; and comparing the color of the material to the color of the pot.

Still other objects, features, and attendant advantages of the present invention will become apparent to those skilled in the art from a reading of the following detailed description of embodiments constructed in accordance therewith, taken in conjunction with the accompanying drawings.

BRIEF DESCRIPTION OF THE DRAWINGS

The invention of the present application will now be described in more detail with reference to preferred embodiments of the apparatus and method, given only by way of example, and with reference to the accompanying drawings, in which.

DESCRIPTION OF THE PREFERRED EMBODIMENTS

Figure 1:
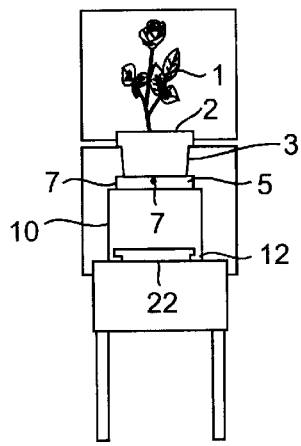
FIG. 1 illustrates a houseplant maintenance device according to the one embodiment of the present invention.

Referring to the drawing figures, like reference numerals designate identical or corresponding elements throughout the several figures.

FIG. 1 illustrates a houseplant maintenance device according to the present invention in one preferred use. A plant 1 is potted in a planter or planter pot 3, which includes soil 2 therein (see also FIG. 2) for maintaining the viability of the plant 1. Pot 3 is placed in a houseplant maintenance device according to the present invention, as illustrated in FIG. 1. The houseplant maintenance device according to the present invention includes a gasket 5 for engaging and securing pot 3 in the houseplant maintenance device. A housing, container, or base 10 supports gasket 5 and includes guide feet 12 for elevating, supporting or securing the base to a surface 22. Surface 22 may be part of a table, as illustrated in FIG. 1. Gasket 5 further includes cups 7 around a periphery thereof, as will be described in further detail below.

Figure 2:
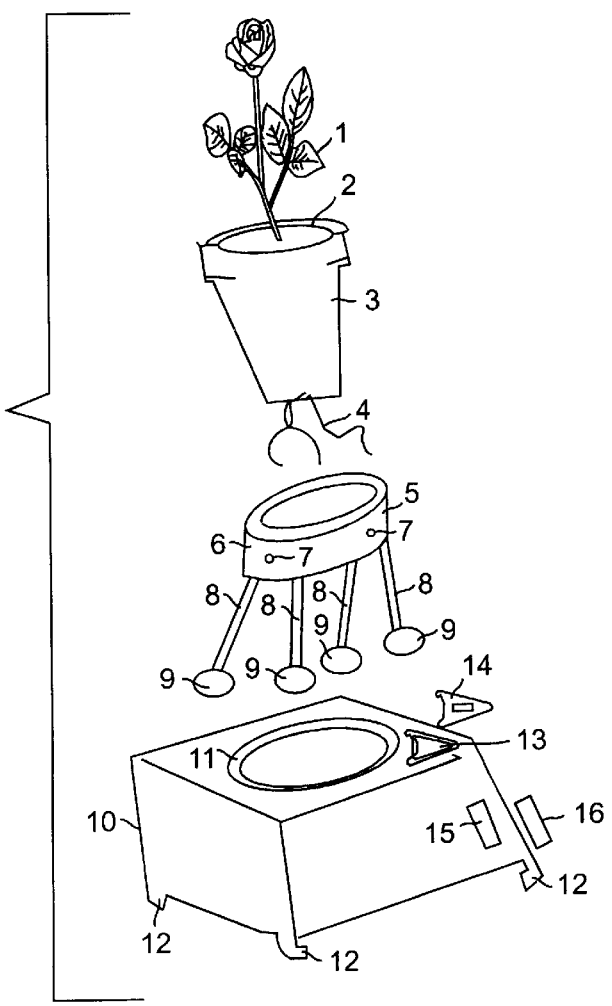
FIG. 2 illustrates an exploded perspective view of the embodiment of a houseplant maintenance device illustrated in FIG. 1.

FIG. 2 illustrates the houseplant maintenance device illustrated in FIG. 1. As illustrated in FIG. 2, gasket 5 includes gasket ring 6, depending legs 8, and feet 9 attached to legs 8, which legs and feet support gasket 5 within base 10, as will be described in greater detail below. In the embodiment illustrated in FIG. 2, gasket 5 includes four legs 8, each leg 8 including a single foot 9. Although the embodiment of gasket 5 illustrated in FIG. 2 includes four legs 8, fewer or more legs may be provided on the gasket without departing from the spirit and scope of the present invention, as will be readily apparent to one of ordinary skill in the art, to provide less or more support for gasket ring 6 and pot 3.

Base 10 receives gasket 5 at seat 11 such that a portion of gasket 5 extends above the seat 11, as illustrated in FIG. 1. Seat 11 may be constructed as a continuous shelf on which gasket 5 is seated, or may, according to another embodiment of the present invention (not illustrated), may include a series of discrete seats or fingers that extend toward the center of the base 10 and which are separated by a series of spaces. Base 10, in the embodiment illustrated in FIG. 2, is a generally rectangular, e.g., cubical, housing which is generally sealed so as to be able to hold water therein, and thereby act as a water reservoir. Base 10 includes a pair of ports 13, 15 for allowing water and other nutrients to be added into the interior of base 10. Port 13 is provided on a top surface of base 10 and may be further provided with a cap or cover 14 for sealingly closing off port 13. According to one preferred use of port 13 and cover 14, base 10 with a plant 1 and pot 3 therein, may be set outside with cover 14 removed from port 13, so that rain may enter base 10 to at least partially fill base 10 with water, thereby providing for prolonged watering of plant 1.

Port 15 may also be provided with a cover 16 for sealingly covering port 15. Port 15 is located on a sidewall of base 10 at a vertical position such that, with cover 16 removed, port 15 acts as a drainage port allowing the liquid contents, e.g., water, to drain from base 10 until the water level therein has reached a predetermined maximum corresponding to the lowest extent of port 15. For example, when base 10 is left outside, rainwater can fill base 10 through port 13 as described above, and drain out port 15. Cover 16 is preferably made of a transparent or translucent material so that the water level in base 10 may be readily observed therethrough. Port 15 may be used for the addition of water or other nutrients to the reservoir within base 10.

Guide feet 12 extend from the bottom of base 10. Guide feet 12 act to support base 10 and a plant I and pot 3 held therein on a surface, e.g., surface 22. Guide feet 12, according to one embodiment of the present invention, may have a cross-section that is approximately L-shaped, as illustrated in FIGS. 1 and 2, for purposes that will be described in greater detail below. Guide feet 12 are preferably provided at all four bottom corners of base 10, but may optionally be provided only on any two adjacent corners, the other corners being supplied with feet (not illustrated) which do not include the L-shape.

A wick 4 extends from the bottom of pot 3 in FIG. 2, the wick drawing water and nutrients from outside of pot 3 up into soil 2 to maintain the viability of plant 1. As will be described in greater detail below, wick 4 extends into the reservoir portion of base 10 when in use, thus conducting water and other nutrients from base 10 into soil 2. Wick 4 is preferably constructed of a core material of biologically inert material which will conduct water and mineral and chemical nutrients therealong. Preferably, wick 4 is constructed of a microfiber material of high surface area such as glass or polymer, e.g., polyester or polyamide, microfiber. One suitable microfiber cloth is available from La Cara, Inc. as Trasan cloth, which is characterized by polymer microfibers having thicknesses from about 0.005 to about 0.01 mm, and having a density of about 260,000 threads per square inch. Other materials capable of conducting water from base 10 to soil 2, will be readily apparent to one of ordinary skill in the art. Bonded cellulose, such as cellulose phosphate paper, has both wicking characteristics and has been used as a strong cation exchanger. By processes described below, these wicks can conduct such essential trace minerals as iron, calcium, magnesium, and molybdenum. Cellulose can also be loaded with silica gel, which in turn is bonded to exchange any number of aqueous nutrients, as will be readily apparent to one skilled in the art.

Figure 3:
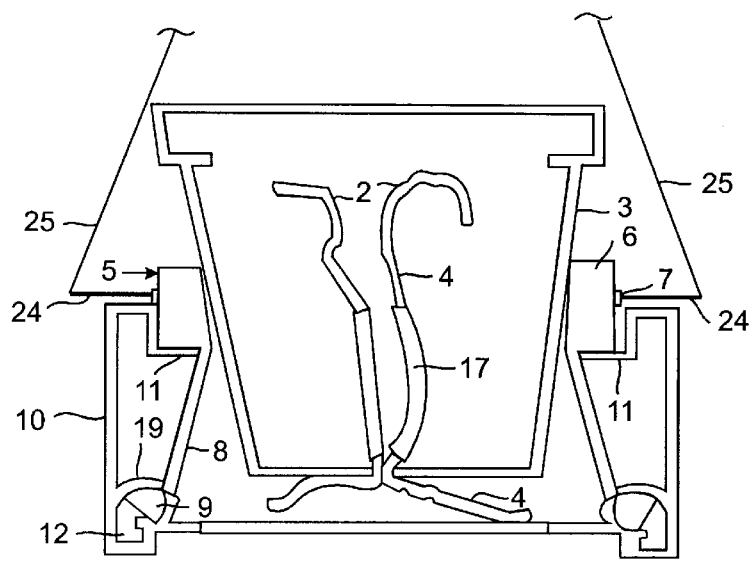
FIG. 3 illustrates a cross-sectional view of portions of a houseplant maintenance device according to the present invention.

FIG. 3 illustrates a cross-section, with portions broken away, of the houseplant maintenance device illustrated in FIGS. 1 and 2. FIG. 3 illustrates pot 3, including soil 2, held within a houseplant maintenance device according to the present invention. Soil 2 is contained within pot 3. Wick 4 extends from within the interior of pot 3 and in intimate contact with soil 2 through the bottom of pot 3, through a opening therein (not shown), and into the reservoir portion of base 10. Gasket 5, including gasket ring 6, engages the exterior wall of pot 3 and holds the pot therein. Legs 8 depend downwardly from gasket ring 6 and into the interior of base 10. Feet 9 of legs 8 engage within seats 19 (see also FIG. 5) which hold feet 9, and therefore legs 8, in place. Legs 8 are constructed to be strong and stiff enough to easily bear the portion of the load of the pot 3 which is not supported by seat 11. Legs 8 are also designed and configured such that legs 8 can fully support pot 3, including soil 2 and plant 1, as will be described in greater detail below. Legs 8 are constructed of a material which is somewhat rubbery and flexible, yet stiff enough to support the full weight of pot 3, soil 2, houseplant 1, and wick 4. Suitable materials include plastics, polymers, metals, and natural and synthetic rubber.

Wick 4 is partially wrapped or encased by a casing 17. Casing 17 is substantially impervious to the passage of nutrients therethrough, preferably is impervious to the passage of water, mineral nutrients, or chemical nutrients, and more preferably is substantially impervious to the passage of water, mineral nutrients, and chemical nutrients therethrough. The impervious nature of casing 17 requires moisture, which moves from one end of wick 4 to the other, to not adsorb from the wick into the soil immediately adjacent casing 17. Preferably, casing 17 is constructed of any moisture impervious material, including but not limited to metals, including metal foils, polymers, including polymeric films, e.g., PTFE and other TEFLON products, latex, and rigid plastics.

FIG. 3 also illustrates portions of a hanger assembly usable with gasket 5. The hanger assembly includes hanging rods 24 which are insertable in cups 7 of gasket 5. Wire extensions 25 are connected to hanging rods 24, as illustrated in FIG. 3, and extend upwardly for supporting the assembly of the houseplant maintenance device including pot 3 and plant 1, as described in greater detail below with reference to FIGS. 6 and 11.

Gasket ring 6, and optionally all of gasket 5, including legs 8 and feet 9, are constructed of a material the color of which is specifically chosen to act as a visual indicator of the moisture content of soil 2 in pot 3. For example, the color of gasket ring 6 may be selected to be somewhat darker than the color as pot 3 when the pot is dry, and to be substantially the same color of the pot when it is wet. Gasket ring 6 thus acts as a visual indicator of the moisture level of soil 2. Pot 3, because it is formed of a porous, moisture-conducting material, contains moisture based upon the moisture content of soil 2, contained therein. Because the material of which pot 3 is constructed becomes darker when wet, and pot 3 is wet when soil 2 is wet, a visual comparison of the colors of gasket 6 and pot 3 gives an indication of the moisture content of soil 2, without the necessity of manually inspecting soil 2. Thus, according to the present invention, the houseplant maintenance device provides an expedient way of quickly ascertaining whether or not the soil within a pot requires watering, and therefore, when used in conjunction with base 10, when the interior reservoir of base 10 should be refilled with water.

Preferably, pot 3 is constructed of a clay or terra cotta material which allows water to flow therethrough, depending on the moisture gradient between the inside surfaces and outside surfaces thereof. Pot 3 may be formed of other porous, water conducting materials, as will be readily apparent to one of ordinary skill in the art. Pot 3 may also be formed of non-porous materials, e.g., polymers or metals. More preferably, when pot 3 is constructed of a clay or terra cotta material, gasket 5 is formed of a material which is a medium to dark-medium rust color, which closely matches or is identical to the color of wet clay or terra cotta, respectively.

Figure 4:
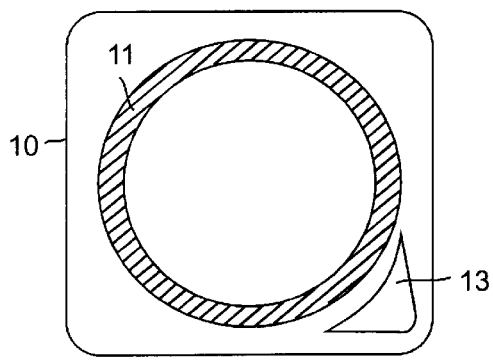
FIG. 4 illustrates a top plan view of a portion of a houseplant maintenance device according to the present invention.

FIG. 4 illustrates a top view of base 10. Seat 11, as illustrated in FIG. 4, is substantially circular, to accept pot 3 having a circular cross-section as illustrated in, e.g., FIG. 3. According to another embodiment of the present invention (not illustrated), seat 11 may take a form other than a circle, e.g., a rectangle, triangle, or other regular or irregular polygonal or geometric shape, which substantially matches the shape of pot 3 inserted therein.

Port 13 is preferably included on the top surface of base 10. Only one port 13 is illustrated in the embodiment of FIG. 4; two or more ports 13 may be provided for greater access to the interior of base 10, as desired. Each such port 13 is preferably provided with a cover 14.

Figure 5:
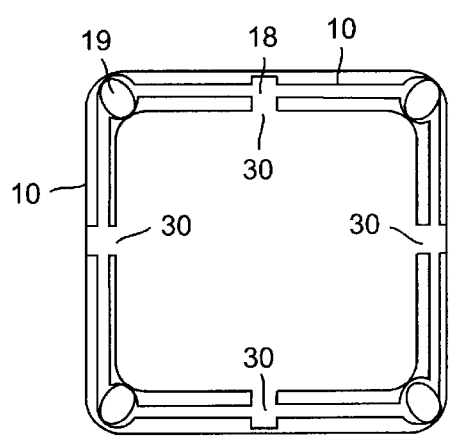
FIG. 5 illustrates interior features of the portion of the houseplant maintenance device illustrated in FIG. 4.

FIG. 5 illustrates, in simplified form, interior features of base 10. Seats 19 are provided in the corners of base 10 for receiving feet 9 therein. A track 18 is provided around the periphery of base 10 and includes track openings 30 spaced along each wall of base 10. Each track opening 30 allows a leg 8 and a foot 9 to be slid into track 18 and moved along track 18 until they engage with and are held in place by seats 19. The function of legs 8, feet 9, track 18, and seats 19 will be described in greater detail with reference to FIGS. 7–10 below.

Figure 6:
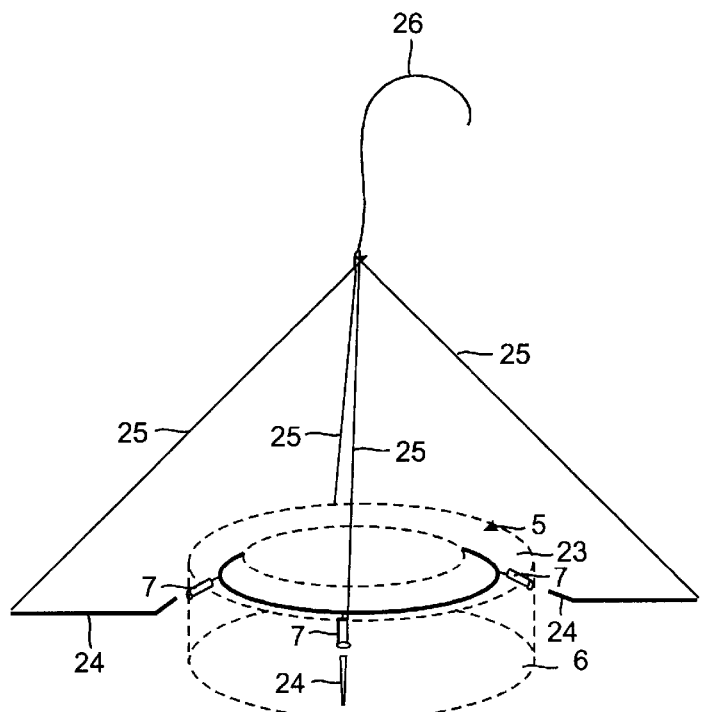
FIG. 6 illustrates portions of a houseplant maintenance device according to the present invention, with certain features shown in phantom for ease of illustration.

FIG. 6 illustrates gasket 5 and a hanging assembly for use therewith. Gasket ring 6 includes a support ring 23 embedded therein. In FIG. 6, gasket ring 6 is shown in phantom lines for ease of illustration only. Cups 7 are secured to support ring 23. Cups 7 extend through gasket ring 6, exposing the interiors of cups 7, and are spaced around the periphery of gasket ring 6. In the embodiment of the present invention illustrated in FIG. 6, four cups 7 are illustrated; although it is preferable to have at least three cups 7 in order to provide adequate stability of the hanging assembly and houseplant maintenance device, more or fewer cups 7 may be provided on support ring 23, as will be readily apparent to one of ordinary skill in the art. If it is desired to support a heavier pot 3, more cups 7 may be provided on support ring 23. Conversely, if a lighter pot 3 is to used with a houseplant maintenance device according to the present invention, fewer cups 7 may be used.

As illustrated in FIG. 6, hanging rods 24 are insertable in cups 7, such that hanging rods 24 provide support to gasket 5. Because gasket 5 includes legs 8 and feet 9 (not illustrated in FIG. 6) which positively engage base 10 at seats 19, hanging rods 24 provide support for the entire houseplant maintenance device and houseplant 1 therein. Hanging rods 24 are connected to wire extensions 25, which lead to a hanging hook 26. Hanging hook 26 may then be used to hang the assembly from an appropriate device, such as that illustrated in FIG. 11.

Figure 7:
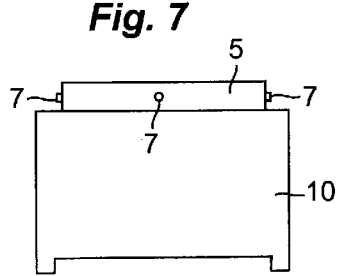
FIG. 7 illustrates a side elevational view of a houseplant maintenance device according to the present invention in a first position.
Figure 8:
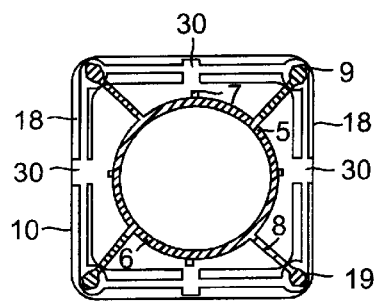
FIG. 8 illustrates an interior view of the houseplant maintenance device illustrated in FIG. 7.

FIGS. 7–10 illustrate the function of gasket 5 with base 10. In the first position, illustrated in FIG. 7, gasket 5 is relatively contained within base 10, although cups 7 still are accessible above the top surface of base 10 in the first position. FIG. 8 illustrates interior portions of base 10 when gasket 5 is in the first position, illustrated in FIG. 7. As illustrated in FIG. 8, feet 9 engage with and are secured by seats 19 in the corners of base 10, because upper portions of the seats are sized smaller than the feet (see FIG. 3), and the interior of the seats are sized to accept the feet. Because seats 19 retain feet 9 therein and keep the feet from moving vertically out of the seats, the gasket 5 and base 10 are secured together.

Figure 9:
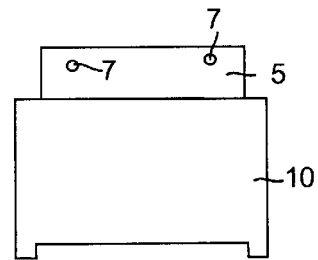
FIG. 9 illustrates a side elevational view, similar to FIG. 7, of a houseplant maintenance device according to the present invention in a second position.
Figure 10:
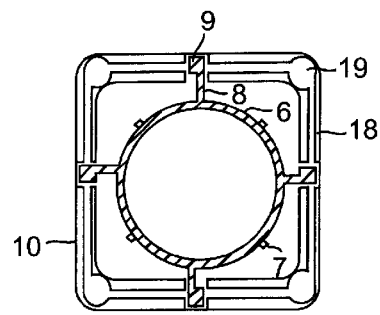
FIG. 10 illustrates interior portions of the houseplant maintenance device illustrated in FIG. 9.

FIG. 9 illustrates a second position of gasket 5 with respect to base 10. FIG. 10 illustrates interior portions of base 10 when gasket 5 is in the second position, illustrated in FIG. 9. In the second position, gasket 5, including legs 8 and feet 9, has been rotated relative to base 10. When rotating gasket 5 relative to base 10, feet 9 move out of seats 19 and into track 18 and move therealong. When feet 9 and legs 8 reach the positions illustrated in FIG. 10, feet 9 are in openings 30 of track 18. Openings 30 are slightly undersized relative to feet 9 and legs 8, such that feet 9 are still retained in track 18 when feet 9 are at track openings 30.

Because of the particular geometry of gasket 5 and base 10 of the houseplant maintenance device according to the present invention, when gasket 5 is moved from the position illustrated in FIGS. 7 and 8 to the position illustrated in FIGS. 9 and 10, gasket ring 6 vertically moves up relative to base 10. Gasket ring 6 moves vertically relative to base 10 because the distance between seats 19 to gasket ring 6 (see FIG. 8) is greater than the distance from track openings 30 to gasket ring 6 (see FIG. 10), as required by the Pythagorean theorem. Thus, rotation of gasket 5 relative to base 10 requires gasket 5 to pop up relative to base 10 when going from the first position to the second position, and to pop down when going from the second position to the first position. In the second position, access to cups 7 is greatly enhanced.

When it is desirable to hang the plant, the plant 1 in pot 3 is lifted out of the base 10 reservoir, leaving gasket assembly 5 in seat 11. The interior of base 10 becomes accessible to manually move feet 9 from retaining ridges 19 into track 18 towards track openings 30. It is not desirable to move the feet into opening 30, as illustrated in FIG. 10, unless the entire gasket assembly 5 is to be removed for cleaning purposes etc. As feet 9 move down track 18, the gasket ring 6 is allowed to vertically rise, making cups 7 accessible to the upwardly angled portion of the hanging assembly 24. The hanging assembly is inserted into the gasket assembly 5 at cups 7 and feet 9 are manually returned to the retaining ridges 19 and snapped into place. Now the empty houseplant maintenance device, equipped with a hanging assembly, is ready to receive the plant 1 in pot 3 into gasket 5. Depending on the size of the plant itself, it may be necessary to bow the wire extensions 25 outward to slide the plant through and into gasket 5. Alternately, one or more of the wire extensions 25 may be equipped with rigid angled portions to slide and clamp into portion 24 after the plant is inserted back into gasket 5. Alternately, one or more of the wire extensions may be devised with manual connections to the hook 26. Other methods of increasing access sufficient to place the potted plant 1 into the houseplant maintenance device equipped with a hanging assembly will be apparent to one of ordinary skill. For example, base 10 may be removed from gasket 5 for cleaning, etc., while still allowing a pot 3 and plant 1, supported in gasket 5, to be undisturbed in the process. Similarly, base 10 may be reattached to gasket 5 by reversing the above-described process: legs 8 and feet 9 are inserted through the opening in the top of base 10; feet 9 are snapped into track openings 30; and base 10 is rotated relative to gasket 5 to move feet 9 into seats 19.

Figure 11:
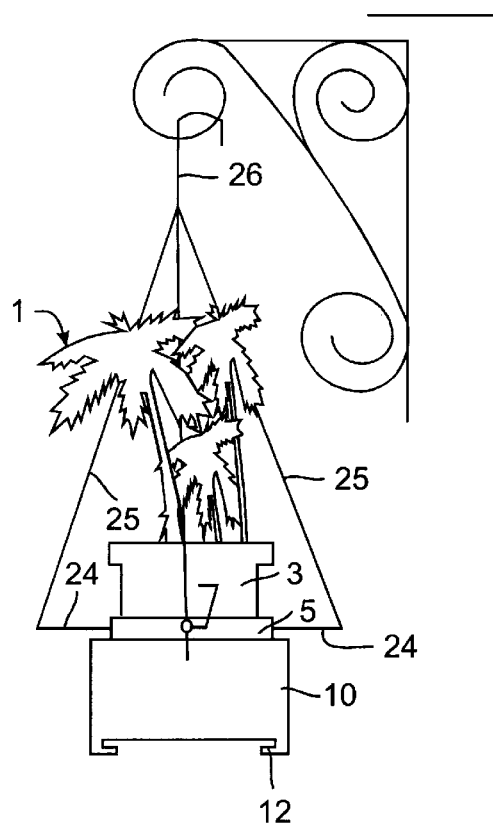
FIG. 11 illustrates an elevational view of a houseplant maintenance device according to the present invention in one exemplary use.
Figure 11:
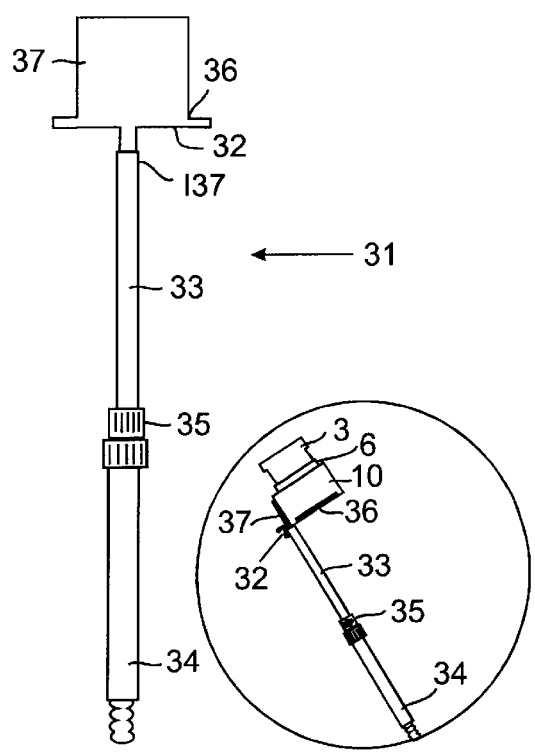

FIG. 11 illustrates one embodiment of a houseplant maintenance device according to the present invention, in one preferred use. FIG. 11 also illustrates an extension pole 31 according to the present invention. Extension pole 31 includes a head 32, an extension rod 33, and a rod of larger diameter with a handle 34. Extension rod 33 and rod with handle 34 may be connected by any means as would be readily appreciated by ordinary skill in the art. One such means is a screw clamp 35, allowing for pole extension 33 to slide inside portion 34. Head 32 and extension rod 33 may be connected by any means as would be readily appreciated by ordinary skill in the art. One such means is a pin 137.

Head 32 is constructed to mate with the bottom of base 10 to allow the houseplant maintenance device to be retrieved from a normally inaccessible height. Head 32 includes a portion 36, which is sized to be received within the bottom of base 10 between feet 12, and is preferably square or rectangular in shape, when viewed from above. Head 32 also includes a portion 37 adjacent to portion 36 for resting against and engaging a side of base 10 when portion 36 in inserted within with the bottom of base 10 and between the feet. In use, extension pole 31 is lifted such that head 32 is inserted into the bottom of base 10 with portion 36 between feet 12, and portion 37 adjacent to a side of base 10. Extension pole 31 is then angled such that portion 37 is retaining the houseplant maintenance against the engaged side of base 10. The houseplant maintenance device may then be lifted to disengage hook 26 and carefully brought down keeping the angle such that the engaged side of base 10 is leaning against portion 37 of head 32. Ease of retrieval of the houseplant maintenance device in this way, due to the design of the base, makes maintaining plants in elevated spaces more practical. Elevated spaces often have more available sunlight for sustaining plants.

Figure 12:
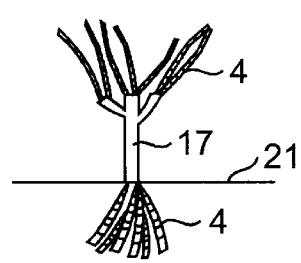
FIG. 12 illustrates a second embodiment of a portion of a houseplant maintenance device according to the present invention.
Figure 13:
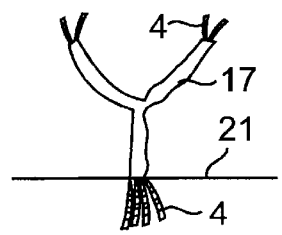
FIG. 13 illustrates a third embodiment of a portion of a houseplant maintenance device according to the present invention.

FIG. 12 illustrates a second embodiment of a wick 4 according to the present invention. Wick 4 illustrated in FIG. 12 includes more individual strands above and below casing 17 than the embodiment illustrated in FIG. 3. The greater number of individual strands increases the surface area of the wick above and below water line 21, which thus creates a greater wicking action through the wick. Thus, the use of a greater number of individual strands of wick 4, as illustrated in FIG. 12, may be used to increase the moisture content in soil 2 of a pot 3, for plants which require a higher moisture content in the soil. Conversely, FIG. 13 illustrates a wick 4 according to a third embodiment of the present invention, wherein a fewer number of strands of wick 4 are provided, and casing 17 is provided to cover more of the wick 4 above water line 21. Thus, according to the embodiment illustrated in FIG. 13, a lower moisture content in soil 2 of a pot 3 may be maintained using wick 4 illustrated in FIG. 13, because of the lower total surface area of wick 4 in contact with soil 2.

Figure 14A:
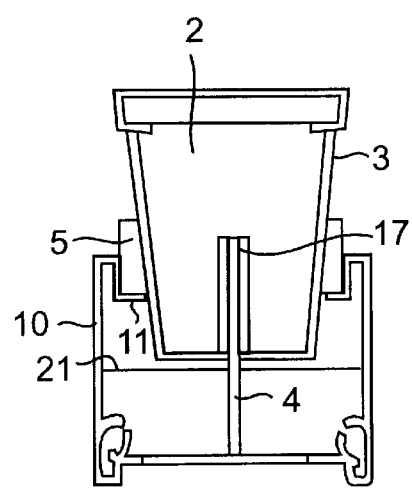
FIGS. 14a and 14b illustrate cross-sectional views of portions of a fourth embodiment of a houseplant maintenance device according to the present invention.
Figure 14B:
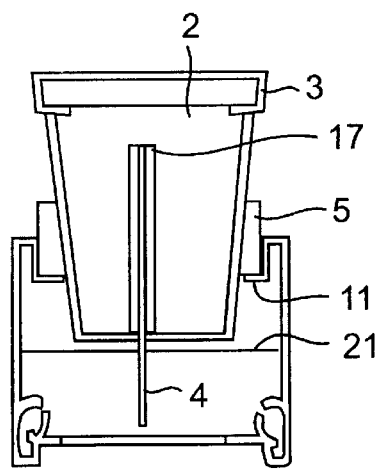

FIGS. 14a and 14b illustrates wicks according to a fourth embodiment of the present invention. In both drawings pot 3, containing soil 2 and a plant 1 (not illustrated), is supported in base 10 by gasket ring 5, as described in greater detail above. For ease of illustration only, legs 8, feet 9 have not been illustrated inn FIGS. 14a and 14b. Gasket 5 rests upon seat 11 of base 10.

Both modulation of moisture levels and control of moisture dispersion patterns in soil 2 are achieved by selectively encasing wick 4 with a length of casing which is impervious to passage of water therethrough. In this way the point of moisture release in soil 2 is controlled at the end of the casing 17. Moisture is thus conducted from the bottom portions of the wick to the top portions of the wick, but is not allowed to pass into the lower portions of soil 2 directly from the wick 4 by virtue of casing material 17. Moisture is thereby released in an elevated portion of the soil. Moisture dispersion through the soil is therefore generally downward toward the bottom of the pot 3, due to the combined effects of gravity and capillary action or dispersion through the soil. Furthermore, as will be readily apparent to one of ordinary skill in the art, evaporation through the porous material of the pot prevents moisture build-up in the soil beyond that which is optimally required for the particular roots of the plant 1. For example, a relatively short casing 17 is chosen to keep relatively wet plants' roots which require relatively more moisture, e.g., fern roots, because wick 4 is in contact with more soil 2 in pot 3, and the dispersion point is closer to the roots (see FIG. 14A). A relatively long casing 17 is selected to keep relatively dry plants' roots which require relatively less moisture, e.g., geranium roots (see FIG. 14B). Furthermore, these optimal moisture levels and dispersion patterns are stable equilibrium conditions. All that is necessary to maintain the condition is to keep a positive water level range in base 10.

Figure 15:
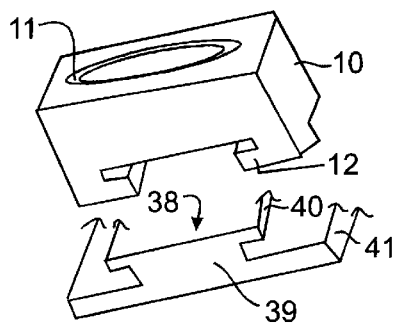
FIG. 15 illustrates a perspective view, with portions broken away, of a portion of a houseplant maintenance device according to the present invention.

FIG. 15 illustrates one embodiment of a system for mounting the houseplant maintenance device according to the present invention. As discussed in greater detail above, base 10 includes guide feet 12, which have L-shaped configurations. According to one embodiment of the present invention, a tongue-and-groove-type assembly may be used to secure base 10 in place. In FIG. 15, the cutouts of feet 12 together form a groove in base 10 in which a correspondingly sized and shaped tongue 38 may be inserted. Tongue 38 includes an upstanding portion 39 and a mating portion 40. Mating portion 40 is sized and configured to be received between guide feet 12 such that base 10, when slid over an end of tongue 38, is retained thereon. Tongue 38 may be provided on a base 41 in a number of environments.

Figure 16:
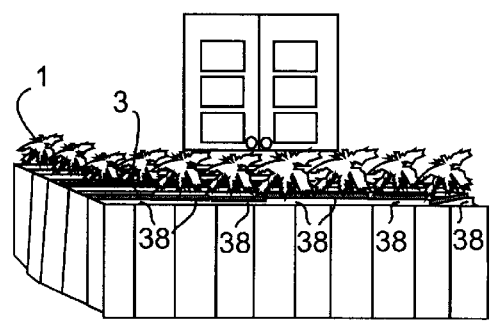
FIG. 16 illustrates numerous houseplant maintenance devices according to the present invention in one preferred use.

FIG. 16 illustrates one embodiment of the use of multiple houseplant maintenance devices according to the present invention, with a tongue-and-groove securing arrangement as illustrated in FIG. 15. As illustrated in FIG. 16, a plurality of houseplant maintenance devices, with pots 3 and houseplants 1 therein, may be used to provide a decorative and bucolic environment.

Each of the houseplants 1 may be provided in a separate houseplant maintenance device according to the present invention, and the plurality of houseplant maintenance devices, illustrated in FIG. 16, can be arranged and mounted on tongue-and-groove arrangements, similar to that illustrated in FIG. 15. Thus, according to the present invention, houseplants with dramatically different watering and nutrient requirements may be arranged in very close proximity to one another and secured in place using multiple, adjacent tongue-and-groove assembly according to the present invention, while allowing for separate watering and supply of mineral nutrients to each individual houseplant 1, according to that houseplant's requirements. Because each of the houseplant maintenance devices illustrated in FIG. 16 separately supply each houseplant retained therein with water and nutrients, houseplants of diverse nutritional needs may be easily maintained together, without concern that the moisture and nutrient needs of one plant will effect an adjacent plant.

Figure 17:
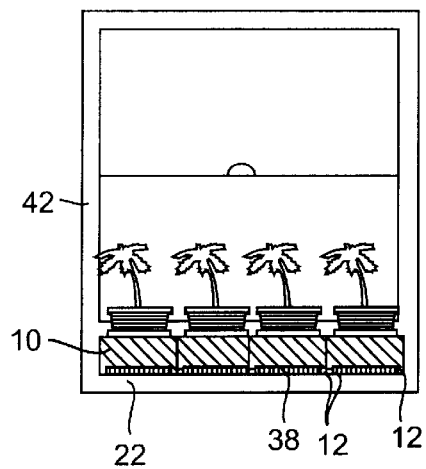
FIG. 17 illustrates numerous houseplant maintenance devices according to the present invention in another preferred use.

FIG. 17 illustrates yet another embodiment of a plurality of houseplant maintenance devices according to the present invention. As illustrated in FIG. 17, guide feet 12 and tongues 38 cooperate, as illustrated in FIG. 15, to allow a plurality of houseplant maintenance devices according to the present invention to be mounted on a surface 22 to create a window-box exterior to a window 42. The design of the houseplant maintenance device for ease of use in outside spaces produces many plants available for rotation indoors for short periods of proximate enjoyment.

Figure 18:
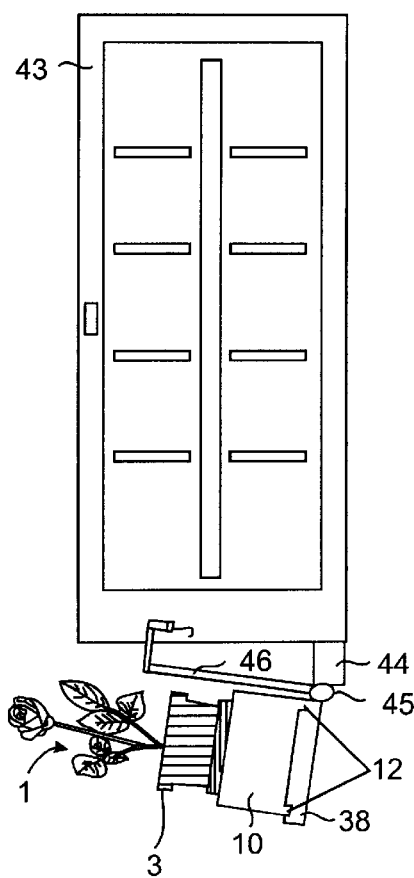
FIG. 18 illustrates a houseplant maintenance device according to the present invention in yet another preferred use.

FIG. 18 illustrates yet another embodiment according to the present invention. A houseplant maintenance device is mounted via guide feet 12 to a tongue 38, similar to that illustrated in FIG. 15. In the embodiment illustrated in FIG. 18, a houseplant maintenance device according to the present invention is mounted exterior of a casement window or shutter, which includes a sash 43 vertically hung to swing outward. In order not to permanently obstruct sash 43, tongue 38 is mounted such that it and attached base 10 may be swung out of the way of the sash. Specifically, tongue 38 is attached to a block or plank 44 at hinge 45. Extending from hinge 45, a houseplant maintenance device according to this embodiment of the present invention may be provided with an articulated hook and arm assembly 46, as illustrated in FIG. 18, for securing the houseplant maintenance device and tongue 38 in position. Block or plank 44 is preferably secured from movement relative to sash 43.

When it is desirable to open window or shutter 43, the houseplant maintenance device and tongue 38 are pivoted around hinge 45 away from the swinging sash 43, thus providing unobstructed use of the window or shutter. Once opened, the houseplant maintenance device can be pivoted back to its preferred upright position and hooked to a stationary portion of the frame. Pivotal rotation of the houseplant maintenance device up to about 80 degrees or more is achieved by anchoring the tongue and groove assembly to the pivoting plank 44. Further, the potted plant 1 is supported up through gasket 5 by the legs 8 which feet 9 are anchored to the retaining ridges 19 on the interior floor of base 10. Typically for this application the ports in base 10 would be oriented to the inside of the window when upright and upward when in the pivoted position.

According to yet another embodiment of the present invention (not illustrated), hinge 45 may be constructed such that the houseplant maintenance device and tongue 38 swing in a plane substantially perpendicular to the plane of door 43, i.e., out of the plane of FIG. 18. In this alternate embodiment, houseplant 1 is always maintained in a normal and untilted orientation, thus preventing houseplant 1 from falling out of pot 3, or the pot falling out of base 10. Also, by constructing and arranging hinge 45 such that the houseplant maintenance device according to the present invention pivots out of the plane of the illustration of FIG. 18, the contents of the interior reservoir of base 10 (water and, optionally, mineral nutrients) will not be subject to spilling out of the several ports provided in base 10.

Figure 19:
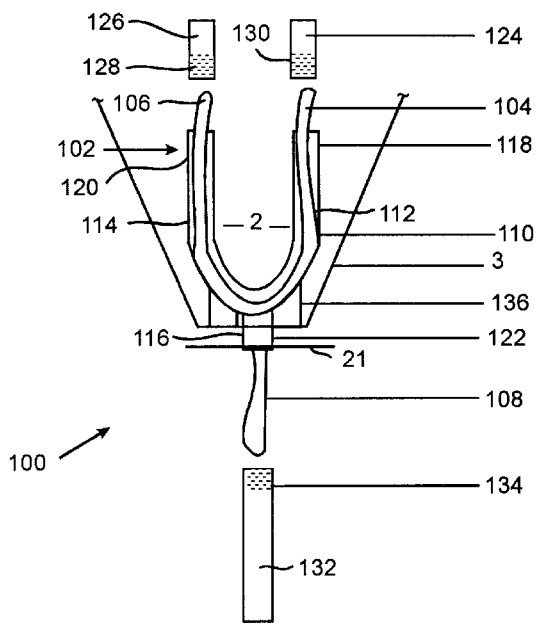
FIG. 19 illustrates yet another embodiment of portions of a houseplant maintenance device according to the present invention.

FIG. 19 illustrates a fourth embodiment 100 of a portion of a houseplant maintenance device according to the present invention. As illustrated in FIG. 19, a wick 102 is placed in a pot 3 in soil 2, for maintaining a houseplant (not illustrated) therein. Wick 102 includes a first branch 104 and a second branch 106, and a depending portion 108, intended to extend below water level 21 within base 10 (not illustrated in FIG. 19; see, e.g., FIG. 14). The embodiment 100 illustrated in FIG. 19 is particularly useful when the material out of which wick 102 is constructed is delicate, e.g., glass fiber or chemically-treated cellulose. In order to protect wick 102 from damage, the embodiment 100 illustrated in FIG. 19 further includes a rigid casing 110. Casing 110 includes a first branch 112 which surrounds and encases a portion of wick first branch 104. Rigid casing 110 also includes a second branch 114 which surrounds and encases wick second branch 106. Rigid casing 110 also includes a depending branch 116 which surrounds and encases depending portion 108. Rigid casing 110 is constructed of a material which is selected to be impervious to the passage of moisture therethrough. Although suitable materials for casing 110 will be readily apparent to one of ordinary skill in the art, preferably rigid casing 110 is constructed of a rigid or semi-rigid polymer material.

First branch 112 of casing 110 includes a fitting 118 thereon, which is preferably a male screw fitting. Second branch 114 of casing 110 similarly includes a fitting 120 which is also preferably a male screw fitting. Depending branch 116 also includes a fitting 122 which is also preferably a male screw fitting. Rigid casing 110 further includes caps 124, 126, and 132, which are sized to receive within their interiors first branch 104, second branch 106, and depending portion 108, respectively, to protect wick 102 from the potential of damage during transportation and handling of the wick. Cap 124 includes a fitting 130, which is also preferably a female screw fitting, for mating with fitting 118 of first branch 112 of rigid casing 110. Similarly, Cap 126 is removably connectable to second branch 120 and is provided with a fitting 128 which is preferably a female screw fitting, which is configured to mate with fitting 120 on branch 114. Bottom cap 132 also preferably includes a fitting 134, which is also preferably a female screw fitting, to mate with fitting 122 of depending branch 116. Thus, when removable caps 124, 126, and 132 are placed over branches 104, 106, and 108, respectively, of wick 102, and the mating fittings removably attached, wick 102 is fully encased by rigid casing 110, thereby fully protecting and sealing wick 102 from damage during transportation and handling. Preferably, caps 124, 126, and 132 are constructed of the same material as the rest of casing 110. Rigid casing 110 further includes radially spaced legs 136 for stabilizing the casing and the wick in pot 3.

The embodiment 100 of the present invention illustrated in FIG. 19 advantageously provides two moisture release points, at first branch 104 and second branch 106 of wick 102, for releasing water and nutrients into soil 2, conducted through the wick from depending portion 108 thereof. More or fewer branches may be provided as needed without departing from the spirit and scope of the invention. In operation, wick 102, encased by rigid casing 110, is inserted into a pot 3 such that bottom cap 132 extends through a bottom hole (not shown) of the pot. Soil 2 may then be added to the pot and allowed to settle. After soil 2 has settled in pot 3, caps 124 and 126 may be removed from rigid casing 110, thereby exposing first and second branches 104, 106 of wick 102 to the soil. When it is desirable to utilize wick 102 to conduct moisture and nutrients into soil 2, bottom cap 132 may be removed, and the assembly of pot 3 and device 100 may be inserted into a base 10 (not illustrated in FIG. 19; see, e.g., FIG. 14), with depending portion 108 of wick 102 at least partially below a water level 21 within the base. As described above, wick 102 conducts moisture and nutrients from depending portion 108 to first branch 112 and second branch 114 thereof and into soil 2, thus providing moisture and nutrients for a plant potted therein (not shown), in a manner similar to that of the embodiment illustrated in and described with reference to FIGS. 1–18.

Removal of device 100 from pot 3 is also easily facilitated by the installation of device 100, described above. According to one embodiment of the present invention, a wick 102 may be easily replaced in a pot 3 by replacing cap 132 on rigid casing 110, inverting pot 3 and removing pot 3 from soil 2. Thereafter, wick 102 and casing 110 may then be simply pulled out of soil 2, and replaced with another device 100, as needed, inserted in the cavities left by prior device 100. Pot 3 may then be replaced over soil 2 and device 100, with bottom cap 132 extending through the hole in the bottom of pot 3 (not illustrated), and the assembly of pot 3 and device 100 reinserted in a base 10.

Figure 20:
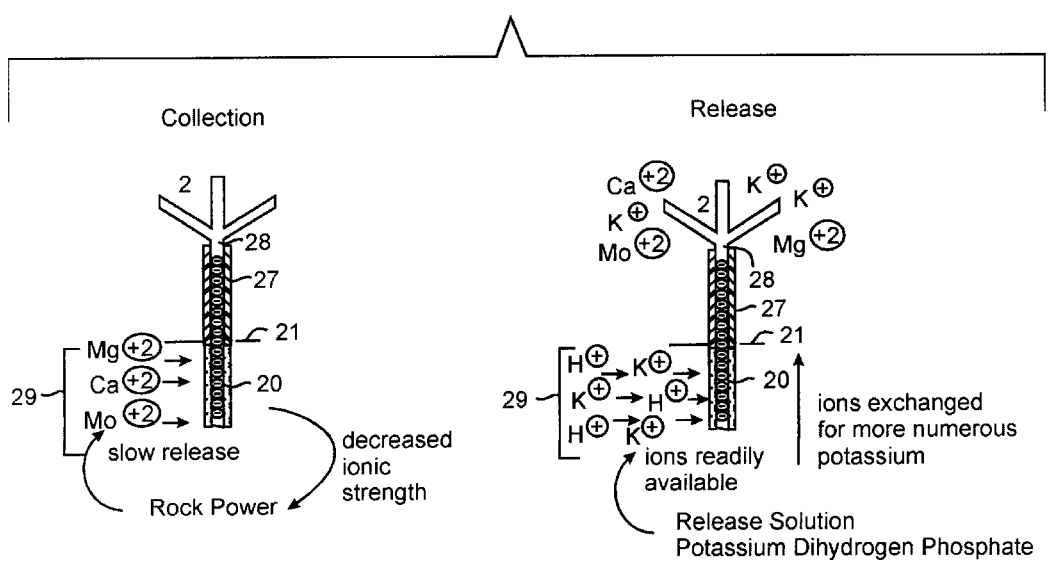
FIG. 20 illustrates yet another embodiment of portions of a houseplant maintenance device according to the present invention.

FIG. 20 illustrates a wick according to a fifth embodiment of the present invention. In the embodiment illustrated in FIG. 20, wicks are in contact with the soil 2 and the water line 21 in base 10, as in FIGS. 3 and 14. For ease of illustration, only the wick construction and nutrient conductance process are shown in FIG. 20. The water held in base 10 preferably includes a source of mineral nutrients, e.g., rock powder, which decomposes to slowly release nutrient cations 29 such as calcium, magnesium, and molybdenum in quantities balanced by nature. A wick 28 is provided for conducting both water and positively charged mineral nutrient 29 from below the water surface into the soil 2.

Wick 28 is partially wrapped in or encased by a casing 27, which may be the same as casing 17, described in greater detail above. Alternately, casing 27 may be constructed with embedded bonded resin that carries a positive charge so as to repel positively charged mineral particles 29. The charged casing would therefore prevent mineral adhesion to casing 27, and thereby allow the particles to be carried up the wick by water wicking up from the bottom to the top thereof. Wick 28 may be constructed of negatively charged material, such as cellulose bonded with phosphate groups. One such material is available as Whatman P81 Cellulose Phosphate Chromatography Paper #3698-915. Optionally, if negatively charged nutrients were desired to be conducted, wick material could be bonded with positively charged groups such as diethylaminoethyl functional groups. One suitable material is available as Whatman DE 81 DEAE Cellulose #3658-915. Strong and weak ion exchangers on various other media capable of wicking action, such as cellulose loaded with silica gel, will be readily apparent to those skilled in the art.

A wrapping 20 is provided around lower portions of wick 28. Wrapping 20 excludes solid materials from clogging wick 28, and is preferably formed of a nylon mesh material or a membrane which allows dissolved particles 29 and water to move therethrough but excludes large particles, which would clog wick 28. Other materials may be used for wrapping 20 without departing from the spirit and scope of the present invention, as will be readily apparent to one of ordinary skill in the art.

The process by which the nutrients are conducted into the soil and become usable to the plant root system involves two phases, a collection phase and a release phase, as illustrated in FIG. 20. In the collection phase, the longest phase of the two cycles, the rock powder dissociates to form nutrient cations 29 such as calcium, magnesium, and molybdenum, that are discharged into the aqueous solution in the base 10 reservoir. The cations 29 are attracted to and are retained onto the wick 28, which is negatively charged. Removal of the cations out of solution and onto the wick decreases the ionic strength of the solution and encourages more dissociation according to LeChatelier's Principle.

After a sufficient level of nutrients 29 is collected onto the wick 28, a release phase is commenced of relatively short duration. In the release phase the bottom of wick 28 is immersed into a relatively strong ionic solution. A suitable solution is one of potassium dihydrogen phosphate buffer. Positively charged ions of potassium and hydrogen are numerous in the strong ionic solution and are available and attracted to the negatively charged wick 28. The cations on the wick are exchanged and displaced by the more numerous cations in the release solution. The nutrient cations collected over the long collection cycle are carried upward into the soil. Potassium and hydrogen are also essential plant nutrients and not harmful as long as a proper pH is maintained in the soil, as will be readily apparent to one of ordinary skill in the art. Other releasing solutions can be formulated of buffer solutions of citrate or sorbate which act as antimicrobials. The nutrient release step can be accomplished by placing the bottom of wick 28 in a small container of release solution inside base 10 between watering cycles. As with moisture, release of mineral nutrients high into the soil allows gravity as well as electrostatic interactions to carry the nutrients to the plant roots.

While the invention has been described in detail with reference to preferred embodiments thereof, it will be apparent to one skilled in the art that various changes can be made, and equivalents employed, without departing from the scope of the invention.

What is claimed is:

1. A system useful for conducting a nutrient within a growing medium, the system comprising:

a plant container including an interior, a bottom surface, and a hole extending through the bottom surface; and a wick including portions extending through the plant container hole, the wick comprising a length of core material including a first lower end and a second upper end, said core material capable of conducting said nutrient from said first end to said second end by wicking; and a casing around a central portion of said core material, at least one of said first lower end and said second upper end of said core material extending out of said casing, said casing including a portion extending into said container interior and which surrounds said core material, said casing formed of a material which is impervious to a nutrient selected from the group consisting of water, mineral nutrients, chemical nutrients, and mixtures thereof;

wherein a portion of said core material adjacent said first lower end wrapped with a material which prevents solids from clogging said wick.

2. A system according to claim 1, wherein said casing carries an electric charge which repels said nutrient to prevent said nutrient from binding with said casing.

3. A system according to claim 1, wherein said material which prevents solids from clogging said wick comprises a material selected from the group consisting of mesh and a membrane.

4. A system according to claim 1, wherein said core material comprises bundled microfiber having a high total surface area and strong capillary action.

5. A system according to claim 1, wherein said core material attracts cations.

6. A system according to claim 1, further comprising:

growing medium in said plant container; and a plant in said growing medium, said plant comprising roots extending through said growing medium to lower root ends;

wherein said second upper end of said core material is positioned above said lower root ends; and whereby said wick transports a nutrient into said growing medium above said lower root ends and gravity pulls said nutrient downward toward said lower root tips.

7. A system according to claim 1, wherein said core material includes a first leg including said first lower end, a second leg including said second upper end, and a third leg adjacent to said second leg.

8. A wick useful for conducting a nutrient within the growing medium of a plant container, comprising:

a length of core material including a first lower end and a second upper end, said core material capable of conducting said nutrient from said first end to said second end by wicking; and a casing around a central portion of said core material, at least one of said first lower end and said second upper end of said core material extending out of said casing, said casing formed of a material which is impervious to a nutrient selected from the group consisting of water, mineral nutrients, chemical nutrients, and mixtures thereof:

wherein said casing comprises a fitting, an exposed portion of said core material extending out of said fitting, and further comprising a cap including a fitting which is sized and configured to mate with said casing fitting, said cap sized to receive said exposed core material portion therein when said casing fitting mates with said cap fitting.

9. A wick useful for conducting a nutrient within the growing medium of a plant container, comprising:

a length of core material including a first lower end and a second upper end, said core material capable of conducting said nutrient from said first end to said second end by wicking; and a casing around a central portion of said core material, at least one of said first lower end and said second upper end of said core material extending out of said casing, said casing formed of a material which is impervious to a nutrient selected from the group consisting of water, mineral nutrients, chemical nutrients, and mixtures thereof;

wherein said casing comprises:

a first leg including a first fitting, a first portion of said core material extending beyond said first fitting;

a first cap including a fitting which is sized and configured to mate with said first fitting, said first cap sized to accept said core material first portion therein when said first leg fitting mates with said first cap fitting;

a second leg including a second fitting, a second portion of said core material extending beyond said second fitting;

a second cap including a fitting which is sized and configured to mate with said second fitting, said second cap sized to accept said core material second portion therein when said second leg fitting mates with said second cap fitting.

10. A wick according to claim 9, wherein said casing further comprises.

a third leg including a third fitting, a third portion of said core material extending beyond said third fitting;

a third cap including a fitting which is sized and configured to mate with said third fitting, said third cap sized to accept said core material third portion therein when said third leg fitting mates with said third cap fitting.

\* \* \* \* \*